United States Patent
Turner et al.

(10) Patent No.: US 7,099,627 B2
(45) Date of Patent: Aug. 29, 2006

(54) SYSTEMS AND METHODS FOR A WIRELESS NETWORK CONNECTION POINT LOCATOR

(75) Inventors: John Turner, Bowen Island (CA); John Cavacuiti, North Vancouver (CA); David G. Pike, Nanaimo (CA); Richard James Elgie, Los Gatos, CA (US)

(73) Assignee: ACCO Brands USA LLC, Lincolnshire, IL (US)

( * ) Notice: Subject to any disclaimer, the term of this patent is extended or adjusted under 35 U.S.C. 154(b) by 0 days.

(21) Appl. No.: 10/855,860

(22) Filed: May 26, 2004
(Under 37 CFR 1.47)

(65) Prior Publication Data

US 2005/0113031 A1    May 26, 2005

Related U.S. Application Data

(60) Provisional application No. 60/478,006, filed on Jun. 11, 2003.

(51) Int. Cl.
*H04B 17/00* (2006.01)
(52) U.S. Cl. .................. 455/67.11; 455/67.7; 455/411; 455/412.1; 455/418; 455/421
(58) Field of Classification Search ............. 455/67.11, 455/67.7, 411, 412.1, 412.2, 418, 421, 9, 455/11.1
See application file for complete search history.

(56) References Cited

U.S. PATENT DOCUMENTS

| | | | |
|---|---|---|---|
| 5,574,979 A | 11/1996 | West | |
| 5,689,816 A | 11/1997 | Lee et al. | |
| 5,752,189 A * | 5/1998 | Ueno et al. | 455/435.1 |
| 5,771,441 A | 6/1998 | Altstatt | |
| 6,022,918 A * | 2/2000 | Lienert et al. | 524/275 |
| 6,035,212 A | 3/2000 | Rostoker et al. | |
| 6,493,550 B1 | 12/2002 | Raith | |
| 6,671,494 B1 | 12/2003 | James | |
| 6,788,937 B1 * | 9/2004 | Willenegger et al. | 455/434 |
| 6,891,496 B1 * | 5/2005 | Husted et al. | 342/57 |
| 2002/0154622 A1 | 10/2002 | Hammel et al. | |
| 2003/0129966 A1 * | 7/2003 | Le Bars et al. | 455/411 |
| 2004/0028003 A1 * | 2/2004 | Diener et al. | 370/319 |
| 2004/0132446 A1 | 7/2004 | Seedman et al. | |
| 2004/0202133 A1 | 10/2004 | Filipovic et al. | |
| 2005/0032516 A1 * | 2/2005 | Marchevsky | 455/426.2 |

FOREIGN PATENT DOCUMENTS

WO   WO 03/092178 A1   11/2003

* cited by examiner

*Primary Examiner*—Matthew D. Anderson
*Assistant Examiner*—Minh Dao
(74) *Attorney, Agent, or Firm*—Townsend and Townsend and Crew LLP

(57) ABSTRACT

Systems and methods for determining the presence of a wireless network connection point based upon wireless network characteristics. Examples of such characteristics include, but are not limited to: message length, repetition rate and response timing. These types of characteristics are used to differentiate various types of wireless networks from other radio frequency signals within a given band. The output of the locator is compared against desired thresholds to indicate signal strengths roughly corresponding to current wireless networks cards.

19 Claims, 2 Drawing Sheets

SYSTEMS AND METHODS FOR A WIRELESS NETWORK CONNECTION POINT LOCATOR

CROSS-REFERENCES TO RELATED APPLICATIONS

This application is a non-provisional application and claims the benefit of Application No. 60/478,006, filed Jun. 11, 2003, entitled "Method and Apparatus for Portable Wireless Network Location System," the disclosure of which is incorporated herein by reference for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

1. Field of the Invention

The present invention pertains to systems and methods for locating a wireless network connection point and, more particularly, to systems and methods for detecting the presence of a wireless network.

2. Description of the Prior Art

Portable computers, laptop computers, notebook computers, personal digital assistants (PDAs), and other portable electronic devices are extremely popular in today's modern society. It is extremely important for many people, both professionally and personally, to be able to retrieve, in real time, various types of information. It is often especially important to such people to retrieve various types of messages.

Accordingly, many of these people rely on their portable electronic devices for accessing networks so that they may retrieve information and messages conveniently. Unfortunately, it is currently a time consuming task to power up and log on to a portable computer or electronic device only to find that a wireless network connection point is not available, thus wasting the person's time and wasting power.

SUMMARY OF THE INVENTION

Broadly, the present invention provides systems and methods for determining the useable presence of a wireless network connection point based upon various message envelope characteristics. Examples of such characteristics include message length, repetition rate and response timing. These types of characteristics are used to differentiate various types of network connections from other signals within a given radio frequency band. The output of a locator in accordance with the present invention indicates signal strength.

Thus, in accordance with the present invention, a portable device for determining the useable presence of a wireless network connection point includes a radio frequency detector that has a signal processor for evaluating a detected signal based upon wireless network characteristics. The device further includes an indicator that indicates at least the presence of a detected signal.

In accordance with one aspect of the present invention, the device further includes a signal strength indicator.

In accordance with another aspect of the present invention, the indicator indicates that the device is searching for useable presence of a wireless network connection point.

Also in accordance with the present invention, a method of determining the useable presence of a wireless network connection point includes searching for a signal. Upon detecting a signal, the detected signal is evaluated based upon wireless network characteristics. Based on these characteristics, the signal is identified as IEEE 802.11b, IEEE 802.11g, Bluetooth, GSM cellular telephone, PCS cellular telephone, cordless land-line telephone, or various other Radio Frequency standards. The presence and/or type of the detected signal is indicated.

In accordance with one aspect of the present invention, a floating threshold may be used to discern the signal from ambient RF noise. By detecting the strength of coherent signals with respect to ambient RF noise, the threshold of detection is equivalent to that of a WNIC PC Card. One example includes coherent signals being detected that are less than 3 deciBels (dB) above the ambient RF noise.

In accordance with another aspect of the present invention, the method also includes indicating the strength of the detected signal. By use of a logarithmic detector, the signal strength range is equivalent to the signal strength readings of typical WNIC PC Cards, and the signal strength indication is calibrated to the signal strength readings of typical WNIC PC Cards.

In accordance with a further aspect of the present invention, the method also includes indicating that no signal is detected if no relevant or coherent signal is detected above the ambient RF noise level.

In accordance with yet another aspect of the present invention, the device is fully portable and self-contained.

In accordance with a further aspect of the present invention, the device optimizes energy use so that it may operate in excess of one year in ordinary use.

In accordance with yet another aspect of the present invention, the direction of the wireless network Access Point may be determined by incorporation of a directional antenna or by comparing the timing and/or strength of signals from at least two antennae.

In accordance with a further aspect of the present invention, direction of the wireless network Access Point may be indicated by additional indicator(s).

Other features and advantages of the present invention will be apparent in view of the following detailed description of preferred exemplary embodiments.

DETAILED DESCRIPTION OF THE INVENTION

The present invention provides a wireless network connection point locator that is a hand-held indicator of the usable presence of a wireless network connection point. The device allows a user to recognize that a connection point is available before embarking on the time consuming and power-wasting task of powering up and logging on to a portable computer or other type of portable electronic device that is capable of communicating with a wireless network. A signal strength indicator is preferably included with the locator and allows the user to select an optimal location for the wireless network connection and a separate indicator preferably identifies that the device is scanning and no connection point is available.

Figure 1:
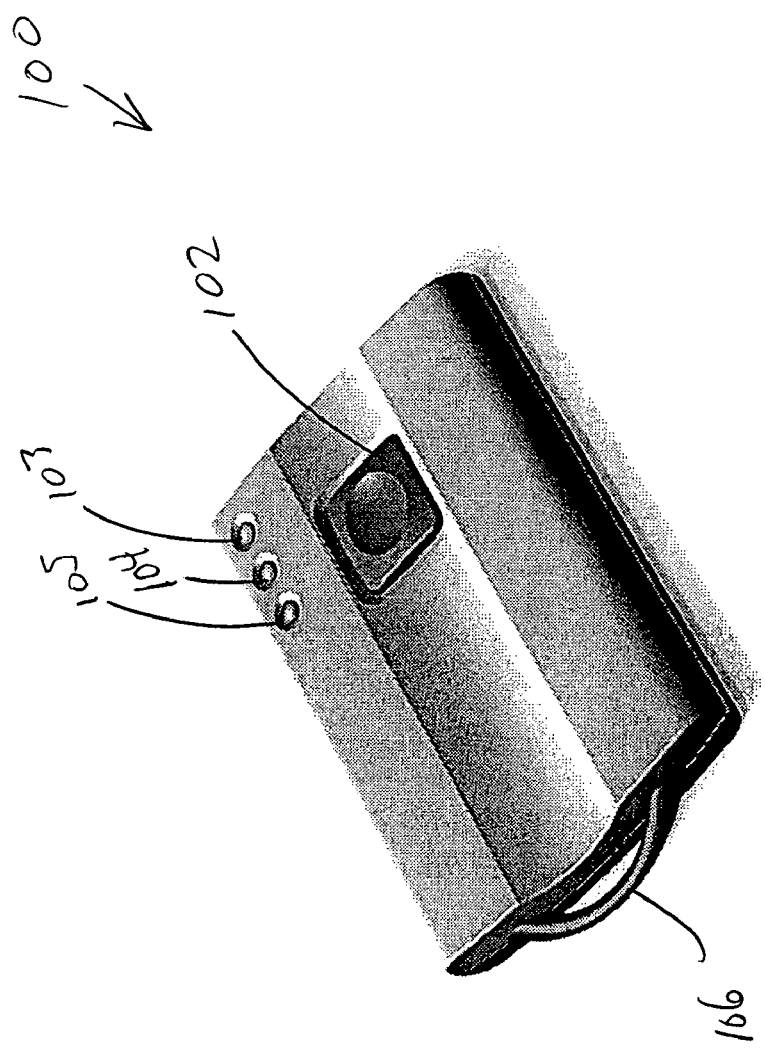
FIG. 1 is a perspective view of an example of a network locator in accordance with the present invention.

FIG. 1 provides a perspective view of an example of a network locator 100 in accordance with the present invention. The locator includes a body 101. On a surface of the body, a control button 102 is provided. At least one indicator 103 is provided. The indicator may be visual, audible, or tactile. In a preferred embodiment, there are three indicators 103, 104 and 105. The indicators may be used, for example, to indicate levels of signal reception, power on/off and lack of a signal (or lack of a signal that meets a certain threshold). At least one antenna 106 is also provided.

Broadly, a self-contained power source is provided that is small and lightweight for maximum portability, preferably, but not limited to "button cell" size (i.e. smaller than AAA). Nonetheless, power-saving features allow the device to operate without replacing, recharging, or refreshing the power source for at least one year in normal use (see Appendix). Techniques to minimize power consumption include strobed sampling, automatic turn-off after 2 minutes, and the "on" switch protected from accidental triggering.

Since the 2.4 GHz radio band is open and unregulated, a great many wireless technologies are present, including, for example, 802.11b, Bluetooth, microwave ovens, and cordless telephones. The design in accordance with the present invention uses various message characteristics, including, for example, message-length, repetition rate, number of repetitions, response timing, and frequency distribution to differentiate various types of network connections from all other signals in the band. For example, an 802.11b base station may be distinguished by a beacon pulse of between 200 and 1200 uSec. transmitted between 5 and 20 times per second. Bluetooth networks may be identified by envelope pulse (120 uSec) width as well as the correct repetition rate (1025 uSec) and a unique frequency spectrum due to the channel-hopping behavior.

A Wireless Network Interface Card (WNIC) is a frequency tuneable, direct sequence spread spectrum receiver. A device in accordance with the present invention preferably uses a wideband front end to allow all the energy in the band to drive the detector. Although this may cause some signal overload and interference issues, in this case it also makes the detector frequency insensitive, i.e. no frequency tuning required, and eliminates the need to de-spread the signal.

A variable comparison point, or floating threshold is used to distinguish detected signals from the ambient RF noise levels. Signals above this threshold that match the wireless network envelope characteristics are preferably identified on a signal strength indicator. Using an adaptive scheme allows detection of the signal at field strengths approaching the sensitivity levels of WNIC cards.

The RF detector preferably provides an analog output that corresponds linearly to the logarithmic strength of the input signal. This allows a dynamic range comparable to WNIC cards, and the output of the detector is used to indicate signal strength, which signal strength level indication is calibrated to thresholds that are meaningful with respect to relevant mobile electronic devices.

A directional antenna or the timing of multiple readings, preferably from at least two antennas, are analyzed to determine the direction of the wireless network Access Point. The direction is preferably indicated by a separate visual, audible, or tactile indicator.

Figure 2:
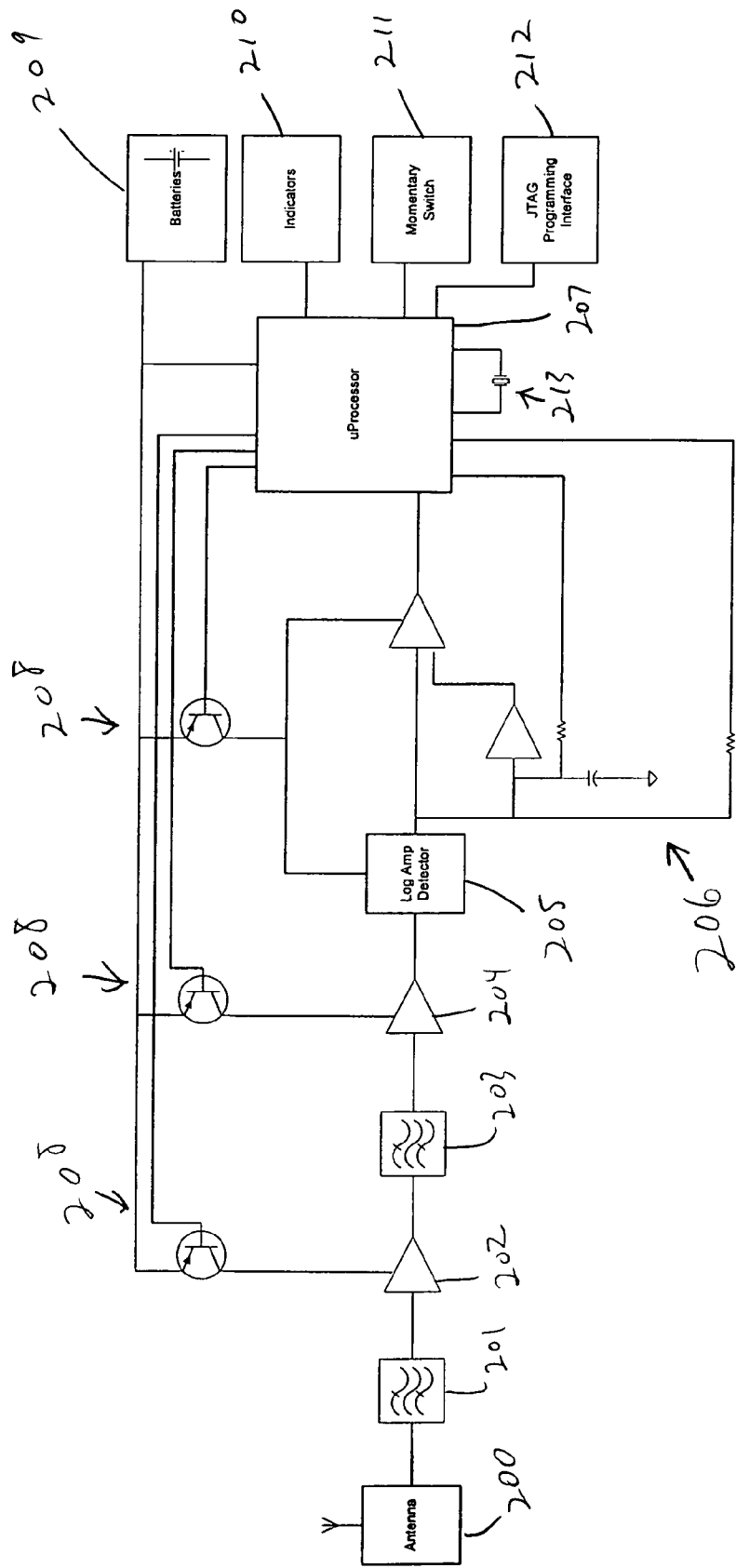
FIG. 2 is a block diagram for an example of a pulse detector for use with a network locator in accordance with the present invention.

FIG. 2 provides a schematic for an example of electronics for locator 100. An antenna 200 is provided that is communicatively coupled to a band filter 201, preferably an ISM band filter, to avoid saturation. An amplifier 202 is communicatively coupled to band filter 201 and a second band filter 203, which is also preferably an ISM band filter. A second amplifier 204 is communicatively coupled to band filter 203 and log amp detector 205. An operational amplifier arrangement 206 is coupled to the log amp detector for providing pulse comparison, noise level sampling and signal signaling. The operational amplifier arrangement is coupled to microprocessor 207.

A plurality of power switches 208 are also provided. The power switches preferably comprise PNP transistors that disable the amps and detector circuitry. A power source 209, preferably in the form of one or two lithium batteries, is provided. The battery(s) is preferably in the form of three volt coin cell batteries. Indicators 210 are provided for illustrating things such as activity of the device, detection of various networks and possible lack of detection. Preferably these indicators are in the form of LEDs. Audible and/or tactile indicators may also be used, either alone or in conjunction with the LED indicators. An activation switch 211 is preferably provided to activate locator 100. Preferably, locator 100 turns off automatically in order to conserve power after a predetermined amount of time. A Boundary Scan interface (JTAG-IEEE 1149.1) 212 is also preferably provided. Finally, a crystal oscillator 213 coupled to the microprocessor is also preferably included.

The antenna is preferably a printed dipole. The band filters are preferably SAW-filters having an I.L. of 2.5 dB and are preferably 100 MHz wide. The amplifiers are preferably 4 mA @ 3V and have a 14 dB gain and 2.5 dB NF. The log amp-detector preferably has 45 dB DR with −45 dBm sensitivity and 5 mA@2.7V with 30 mV/dB. The pulse comparative preferably operates at 6 dB peaks above the noise sample.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of determining a presence of a wireless network connection point using a portable electronic device before powering on a portable computer, the portable computer capable of connecting to the wireless network connection point, the method comprising:

detecting a wireless beacon signal having a repetition rate;
   upon detecting the wireless beacon signal, evaluating the detected wireless beacon signal;
   based on the evaluation, indicating the presence of a wireless network connection point if the repetition rate of the wireless beacon signal is within a predetermined repetition rate range using the portable electronic device; and powering on the portable computer after the presence of the wireless network connection point is indicated by the portable electronic device, the portable computer capable of connecting to the wireless network connection point.

2. The method of claim 1, further comprising receiving an input to search for the presence of the wireless network connection point at the portable electronic device.

3. The method of claim 2, wherein the input comprises a manual input.

4. The method of claim 1, further comprising manually powering on the portable computer and connecting to the wireless network connection point.

5. The method of claim 1, wherein the range of the predetermined repetition rate range comprises a range between 5 and 20 times per second.

6. The method of claim 1, wherein indicating the presence of a wireless network connection point comprises indicating the presence of the wireless network connection if a pulse length is within a predetermined range.

7. The method of claim 6, wherein the pulse length comprises a pulse length between 200 and 1200 uSec.

8. The method of claim 1, further comprising indicating a strength of the detected wireless beacon signal.

9. The method of claim 1, further comprising indicating that no wireless connection point is detected if the repetition rate of no wireless beacon signal is within the predetermined repetition rate range.

10. The method of claim 1, wherein the wireless beacon signal comprises a 802.11 wireless beacon signal.

11. A portable electronic device adapted to perform the method of claim 1.

12. The method of claim 1 wherein the portable electronic device detects only an 802.11 b signal.

13. The method of claim 1 wherein the portable electronic device comprises only one control button.

14. The method of claim 1 wherein the portable electronic device comprises an LED, which lights up when the wireless beacon signal is detected.

15. A method of determining a presence of a wireless network connection point using a portable electronic device before powering on a portable computer, the portable computer capable of connecting to the wireless network connection point, the method comprising:

using the portable electronic device to detect a wireless beacon signal having a repetition rate, wherein the portable electronic device indicates the presence of a wireless network connection point if the repetition rate of the wireless beacon signal is within a predetermined repetition rate range; and powering on the portable computer after the presence of the wireless network connection point is indicated by the portable electronic device, the portable computer capable of connecting to the wireless network connection point.

16. A portable electronic device adapted to perform the method of claim 15.

17. The method of claim 15 wherein the portable electronic device comprises a dipole antenna.

18. The method of claim 15 wherein the portable electronic device comprises a printed dipole antenna.

19. The method of claim 15 wherein the portable electronic device comprises an LED, which lights up when the wireless beacon signal is detected.

* * * * *